United States Patent
Maalioune

(10) Patent No.: US 9,109,538 B2
(45) Date of Patent: Aug. 18, 2015

(54) AIRCRAFT CONTROL SYSTEM

(75) Inventor: Hakim Maalioune, Orgeval (FR)

(73) Assignee: AIRCELLE, Gonfreville L'Orcher (FR)

(*) Notice: Subject to any disclaimer, the term of this patent is extended or adjusted under 35 U.S.C. 154(b) by 369 days.

(21) Appl. No.: 13/578,270

(22) PCT Filed: Feb. 3, 2011

(86) PCT No.: PCT/FR2011/050211
§ 371 (c)(1),
(2), (4) Date: Aug. 10, 2012

(87) PCT Pub. No.: WO2011/098711
PCT Pub. Date: Aug. 18, 2011

(65) Prior Publication Data
US 2012/0304666 A1 Dec. 6, 2012

(30) Foreign Application Priority Data

Feb. 10, 2010 (FR) ..................... 10 00550

(51) Int. Cl.
*F02C 9/00* (2006.01)
*F02C 7/00* (2006.01)
*F02K 1/15* (2006.01)
*F02K 1/76* (2006.01)

(52) U.S. Cl.
CPC . *F02K 1/15* (2013.01); *F02K 1/763* (2013.01); *Y02T 50/671* (2013.01); *Y02T 50/677* (2013.01)

(58) Field of Classification Search
CPC ......... F02K 1/15; F02K 1/763; Y02T 50/677; Y02T 50/671
See application file for complete search history.

(56) References Cited

U.S. PATENT DOCUMENTS

| 5,960,626 | A | * | 10/1999 | Baudu et al. | 60/226.2 |
| 2010/0235001 | A1 | * | 9/2010 | Zaccaria | 700/275 |
| 2010/0292870 | A1 | * | 11/2010 | Saint Marc et al. | 701/3 |
| 2010/0313546 | A1 | * | 12/2010 | Kubiak | 60/226.2 |

FOREIGN PATENT DOCUMENTS

| EP | 1413736 A1 | 4/2004 |
| FR | 2920203 A1 | 2/2009 |
| WO | 03/010430 A1 | 2/2003 |
| WO | 2006/134253 A1 | 12/2006 |
| WO | WO2009/101370 A1 * | 8/2009 |

OTHER PUBLICATIONS

International Search Report issued Apr. 6, 2011 by European Patent Office re: PCT/FR2011/050211; pp. 4; citing: WO 2006/134253 A1, FR 2 920 203 A1, EP 1 413 736 A1 and WO 03/010430 A1.

* cited by examiner

*Primary Examiner* — Michael J. Zanelli
(74) *Attorney, Agent, or Firm* — Brinks Gilson & Lione

(57) ABSTRACT

The invention relates to a system (10) for controlling an aircraft propelled by at least one jet engine housed in a nacelle, characterised in that said system includes: a full authority electronic control unit (100) of the jet engine, intended for monitoring the jet engine, suitable for monitoring and controlling at least one electrical device of the nacelle; and an electric power unit (200) of the nacelle, external to said full authority electronic control unit of the jet engine for monitoring the jet engine, suitable for managing the electric power supply of said electrical device of the nacelle.

10 Claims, 1 Drawing Sheet

AIRCRAFT CONTROL SYSTEM

TECHNICAL FIELD

The present invention relates to an aircraft control system and in particular applies to the control of electrical devices of the nacelle of the thrust inverter type.

BACKGROUND

An aircraft is propelled by several jet engines each housed in a nacelle also harboring a set of complementary devices related to its operation, such as a thrust reversal device or a defrosting system, for example.

The role of a thrust reversal device during landing of the aircraft is to improve its braking capability by redirecting forwards at least one portion of the thrust generated by the jet engine.

In this phase, the thrust reversal device obstructs the gas exhaust nozzle and directs the exhaust flow of the engine towards the front of the nacelle consequently generating a counter-thrust which will be added to the braking of the wheels of the airplane.

The means applied for achieving this re-orientation of flow vary depending on the type of inverter. However, in every case, the structure of the thrust reversal device comprises mobile cowls displaceable between an open position in which they open in the nacelle a passage intended for deflected flows and a closing position in which they close this passage. These mobile cowls may themselves fulfil the function of deflection or more simply a function of actuation of other deflection means such as flaps for obturating the jet.

Another important piece of electric equipment of a jet engine nacelle is the defrosting system for the air intake lip of the jet engine of the aircraft, which resorts to an electric system using a network of heating electrical resistors through which an electric current flows.

An important aspect of these nacelles using electrical systems is the management of the monitoring and control of these different devices of the nacelle.

For the thrust reversal device, the system for controlling displaceable elements presently consists of at least one assembly of electromechanical maneuvering members for maneuvering the elements which may be displaced between their closing and opening positions of the thrust inverter driven by at least one electronic control box of the ETRAS (acronym of Electrical Thrust Reverser Actuation Controller) type electrically connected to an engine control unit of the FADEC (acronym of Full Authority Digital Engine Control) type intended for controlling and monitoring the corresponding jet engine.

This electronic control box is a computer dedicated to the nacelle or to a portion of the latter (a displaceable element or a specific maneuvering member, for example), notably intended to express the orders for opening or closing the thrust inverter delivered by the FADEC into sequences for controlling the displaceable elements and the corresponding electromechanical maneuvering members and for informing the FADEC on the state of the maneuvering members and on the position of the displaceable elements on the other hand.

Although allowing self-management of the nacelle, this aircraft control system has drawbacks.

As the onboard computers are developing increasingly more functionalities related to the development of the devices of the aircraft and notably those related to the nacelle, the interconnections between these onboard computers, the cockpit of the aircraft and the FADEC are increasing.

The abundance of increasingly performing computers becomes detrimental for the communications network between these different computers, as well as for the electric power supply circuit required for their proper operation, making them more complex.

Many dimensioning constraints of the system in volume and mass are then imposed by this control system.

Indeed, the mechanical or communications interfaces as well as the required wirings and cable assemblies increase affecting the mass and the volume of the control system.

Further, the complexity of this control system increases the risks of failure, and the associated maintenance costs are then enhanced.

BRIEF SUMMARY

The invention seeks to overcome the problems defined above.

There exists a need for a simplified and reliable architecture for controlling an aircraft, for which the costs and mass are limited.

For this purpose, the invention proposes a system for controlling an aircraft propelled by at least one jet engine housed in a nacelle, characterized in that it comprises:
 a full authority electronic control unit intended for monitoring the jet engine suitable for monitoring and controlling at least one electrical device of the nacelle, and
 an electric power unit of the nacelle, external to said full authority electronic control unit of the jet engine for monitoring the jet engine, capable of managing the electric power supply of said electrical device of the nacelle.

According to particular embodiments, the system may comprise one or more of the following characteristics, taken individually or according to all technically possible combinations:
 the electric power device of the nacelle is a thrust reversal device, a defrosting device or a variable nozzle device;
 the full authority electronic control unit of the jet engine is capable of ensuring the driving of displaceable elements of the thrust reversal device and of electronic maneuvering members intended for maneuvering said displaceable elements;
 the full authority electronic control unit of the jet engine is capable of ensuring the driving of sequences for controlling actuators of the displaceable elements of the thrust reversal device;
 the full authority electronic control unit of the jet engine is capable of ensuring the driving of position sensors, proximity sensors and/or detectors of the state of the displaceable elements and/or electromechanical maneuvering members;
 the full authority electronic control unit of the jet engine is capable of ensuring the driving of a secondary lock of a displaceable element of the thrust reversal device;
 the full authority electronic control unit of the jet engine and the electric power unit of the nacelle are connected through an electric power supply bus;
 the electric power unit of the nacelle comprises means for rectifying and filtering the electric current from an electric network;
 the electric power unit of the nacelle is capable of driving the sequences for controlling a primary lock and/or brake of the thrust reversal device.

The invention also relates to an aircraft propelled by at least one jet engine housed in a nacelle comprising a control system as described earlier.

BRIEF DESCRIPTION OF THE DRAWINGS

Other aspects, objects and advantages of the invention will become apparent upon reading the following detailed description of embodiments of the latter, given as a non-limiting example and made with reference to the appended drawings wherein.

DETAILED DESCRIPTION

Figure 1:
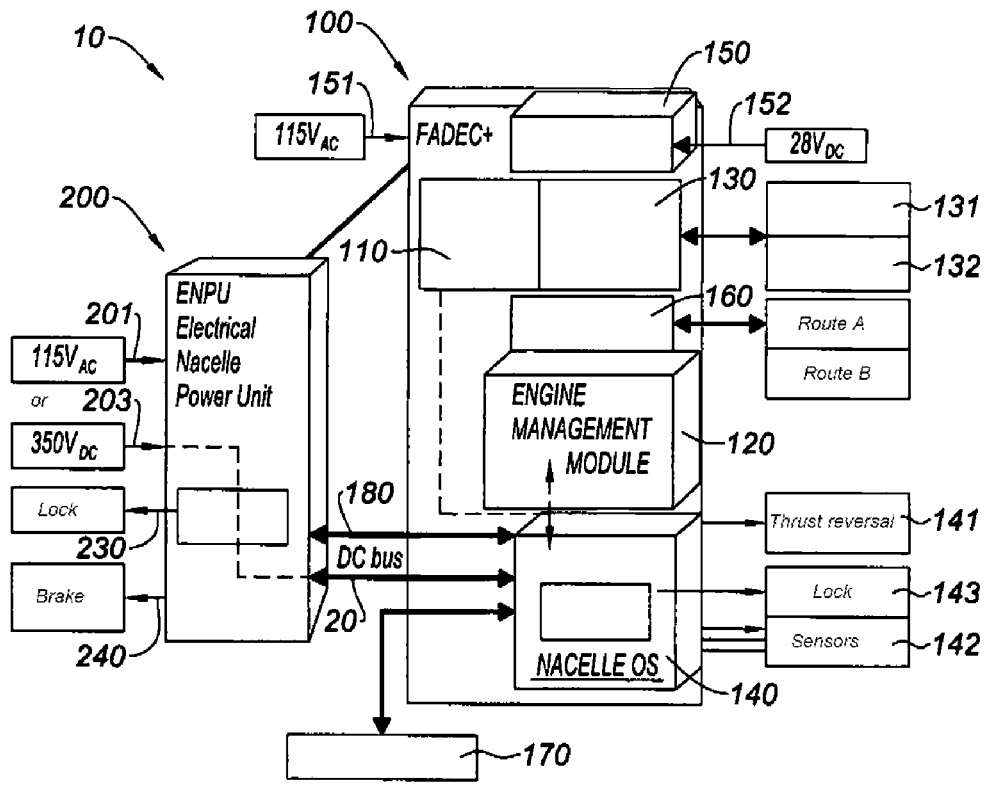
FIG. 1 illustrates a functional diagram of a control system for an aircraft according to an embodiment of the present invention.

FIG. 1 shows an embodiment of an architecture 10 for controlling an aircraft which allows distribution of the functions traditionally applied in control boxes dedicated to the nacelle to two systems, both systems being the following: a full authority digital electronic control unit 100 for jet engine (s) of the aircraft, designated as FADEC in the following, localized in the jet engine, in which a direct connection is established between the controls of the nacelle and the unit 100 and a so-called electric power unit 200 external to the FADEC.

As illustrated in FIG. 1, the aircraft control system 10 comprises in a way known per se, the FADEC 100 which has the function of controlling and monitoring the whole of the functions related to the jet engines of the aircraft.

The FADEC 100 thus comprises an electronic engine controller 110, also called EEC (acronym of Electronic Engine Control) which controls and monitors the whole of the functions related to the jet engines of the aircraft, an assembly here grouped in a module 120 designated as an Engine Management Module, a second computer (not shown) in charge of supervising the critical functions in the case of failure of the controller and of providing the information required for maintenance and their software packages.

It should be noted that the functions of the electronic engine controller 110 may be implemented in one or several computers.

It also comprises a module 130 managing the set of the current/voltage inputs/outputs, which the FADEC needs for the functions for monitoring and controlling the jet engines, such as for example the controls of one or more actuators 131 and 132 of the jet engines.

This module 130 notably comprises connectors, an interface with the actuators of the jet engine and an interface with the sensors related to the jet engine.

It also comprises a module 160 for handling the parameters of the aircraft, intended for acquiring the whole of the parameters of the aircraft received in a way known per se, by a data concentrator via two routes A and B.

As non-limiting examples of functions driven by the FADEC 100, mention may be made of the following functions, i.e. ignition, starting and stopping the jet engine, monitoring thrust and detecting malfunctions, monitoring the inputs/outputs of the FADEC, monitoring the thrust inverters and the anti-defrosting of the nacelle.

According to the invention, FADEC 100 is also suitable for directly controlling at least one electrical device of a nacelle of the aircraft.

By electrical device, is meant any device of the nacelle whether this be an electric power device or a simple monitoring unit associated with the nacelle of the engine.

Mention may be made, as non-limiting examples, of a thrust reversal device, a defrosting/anti-defrosting device or further a variable nozzle device.

By directly, is meant without passing through one or several intermediate control computers other than the EEC 110 of the FADEC 100.

The whole of the controls of the nacelle is thus directly carried out, internally within the FADEC 100 by a non-dedicated computer.

The resources of the EEC 110 of the FADEC 100 are the only resources used for monitoring and controlling the different functions of the electrical devices of the nacelle, grouped in a module 140 for monitoring and controlling the nacelle of the FADEC, designated as nacelle operating software, also comprising the software packages of the nacelle.

These resources are mutualized between the known functions for monitoring and controlling the jet engines and the functions for monitoring and controlling the electrical devices of the nacelle.

The FADEC 100 thus has full authority on the driving of the nacelle and on the operating parameters of the latter.

The FADEC 100 is provided with new functions dedicated to driving the pieces of electrical equipment of the nacelle and notably of the defrosting system, of the reverse cowls, of the thrust reversal device or of the system for varying the nozzle section.

More specifically, as regards the thrust reversal device, an embodiment of the latter provides that it comprises at least one element displaceable between a closing position and an opening position cooperating in the opening position with the production of thrust reversal and at least one assembly of electromechanical maneuvering members for maneuvering the displaceable element between the closing and opening positions.

The displaceable element may in non-limiting examples be a nacelle cowl, doors and/or inversion flaps upstream or downstream from the cowl of the nacelle.

The whole of the electromechanical maneuvering members essentially includes electric actuators intended to actuate the displaceable elements, at least one electric lock, called a primary lock, for retaining each displaceable element and state detectors and sensors of the maneuvering members and of the displaceable elements of the thrust reversal device.

The sensors may comprise position and/or proximity sensors.

The thrust reversal device may also comprise secondary and tertiary electric locks and a brake.

In a known way, this brake is intended to brake the thrust reversal device in the case of excess speed due to failures of the device. It gives the possibility of avoiding any damage to the device.

Each assembly of maneuvering members associated with a displaceable element is directly connected to the FADEC 100, via control lines, and more specifically to the module 140 for monitoring and controlling the FADEC 100 grouping the whole of the functions dedicated to the nacelle.

Thus, in addition to the instructions ordering opening and closing of the thrust reversal device and other orders concerning it, the FADEC 100 is capable of delivering directly at the output of the FADEC 100, control instructions, via the control lines, corresponding to these orders for ensuring the driving of the following functions:

the control 141 of the opening/closing of the thrust inverter being expressed by the driving of the sequences for controlling the actuators for the displaceable elements;

the control 142 of the position sensors of the flaps and actuators to which it is directly connected via a control line and state detectors allowing monitoring of the open or closed position of the doors and flaps. The signals corresponding to the states of the doors and flaps are directly recovered by the FADEC 100 which drives the engines associated with the nacelle accordingly, according to a control strategy, for example either controlling or not the cutting of the power supply of the actuators;

the control of proximity sensors detecting the locked or unlocked state of the locks. The signals corresponding to the states of the locks are directly received by the FADEC 100;

the control 143 of the secondary locks of the displaceable elements. It expresses the controls for opening or closing the displaceable elements in a sequence for controlling secondary locks.

The FADEC 100 also drives the following functions:

the control of the opening/closing of the cowls is expressed by the driving of the sequences for controlling the actuators of the cowls;

the control of the change in nozzle section being expressed by the driving of the sequences for controlling the actuators of the nozzle;

driving the synchronization of the displacements of the cowls and of the flaps according to a particular control law;

the control of the devices for monitoring the nacelle;

the monitoring and control of the inverters of the engines of the nacelle which regulate the phase currents to one or several engines;

expression of the defrosting/anti-defrosting orders into a sequence for controlling the defrosting or anti-defrosting electric circuits of the nacelle.

A portion of this information may then be directly transmitted via a suitable interface to the cockpit of the aircraft.

Moreover, the module 140 for monitoring and controlling the nacelle is connected to the maintenance module 170.

This maintenance module 170 comprises an interface allowing recovering of data internally stored of the module for monitoring and controlling 140 via a memory on the one hand and allowing updating of the software packages of the nacelle comprised in said module 140.

As regards the tertiary lock, provided for resuming the loading of the displaceable elements in the case of failure of the primary and secondary locks, the latter may be directly controlled from the cockpit of the aircraft or from the FADEC 100.

Displacing the control functions related to the nacelle and notably the functions related to the thrust reversal towards the FADEC 100 and mutualizing the control of the thrust reversal cowls and flaps in the FADEC 100 generates a simplification of the electric architecture of the complete propulsion assembly insofar that the number of computers related to the complete propulsion assembly is reduced.

Consequently, the number of power control and monitoring assemblies and the number of electrical and mechanical interfaces are reduced.

The wirings and the connectors are also significantly reduced and the duplicates of back planes are suppressed.

As the orders are internally processed in the FADEC 100, one gets rid of data exchanges between the computers dedicated to the nacelle of the prior art and the FADEC of the prior art, and communication procedures and interfaces are thereby suppressed.

The computing and response times are also reduced.

As the electrical architecture of the propulsion assembly is optimized, the mass and volume of the propulsion system are reduced.

Application of the FADEC 100 described earlier also allows reduction in the operating and maintenance costs.

Moreover, the electric power supply circuit of the aircraft comprises an electric power supply unit 150 internal to the FADEC connected to at least one electric power supply input.

This unit 150 thus powers the electrical equipment of the jet engines such as the sensors and actuators notably.

In an embodiment of the present invention, the electric power supply circuit provides several electric power supply inputs to the electric power supply unit 150: one input 151 for an AC voltage from the airplane network, typically 115 volts and another low voltage one 152, for example 28 volts DC.

Figure 2:
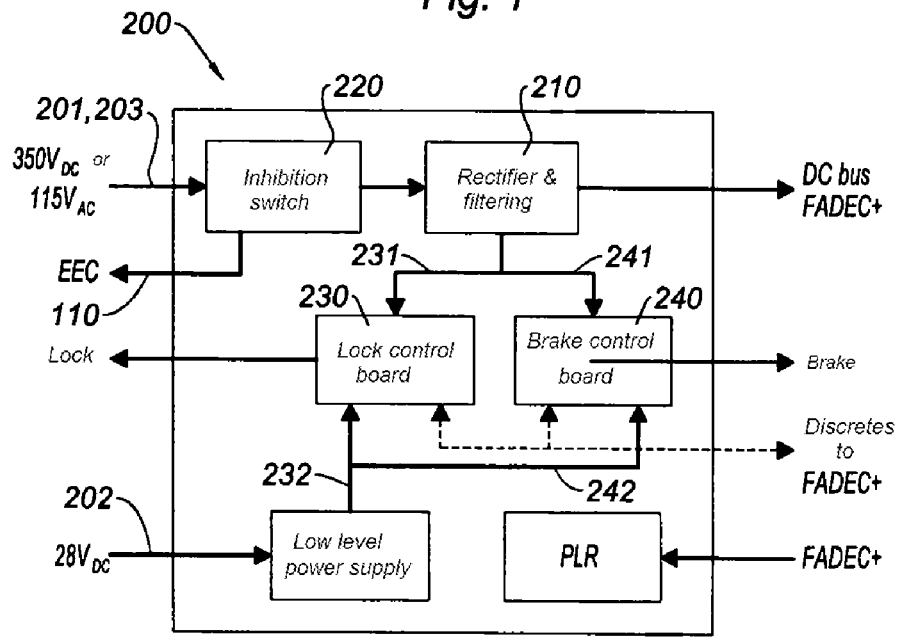
FIG. 2 illustrates a functional diagram of a power unit comprised in the aircraft control system of FIG. 1.

According to the invention, the powering of the electric equipment located in the environment of the jet engine and more particularly, of the electrical devices of the nacelle is managed by the unit 200, a so-called electric power unit of the nacelle, designated as ENPU (acronym of Electrical Nacelle Power Unit) illustrated in more detail in FIG. 2.

This unit 200, external to the FADEC 100, is connected to the latter via at least one bus 20 for distributing electric voltage.

It is a unit 200 which does not comprise any software package and which is mainly intended for managing electric powering of the devices of the nacelle, and notably members for maneuvering the displaceable elements of the thrust inverter, via the electric power supply of the module 140 for monitoring and controlling the nacelle from the FADEC 100.

More particularly, ENPU 200 allows isolation of the functions related to the interface of the electric network.

This unit 200 is connected to the module 140 for monitoring and controlling the FADEC, via indicators 180 (or health status discretes) assuming the form of variables indicating the health status of the ENPU 200.

These indicators 180 provide the advantage of suppressing a complex digital bus and difficult to manage between the ENPU 200 and the FADEC 100.

Moreover, ENPU 200 is connected to various electric power supply inputs.

Thus, ENPU 200 comprises one or several inputs connected via a line to the electric network of the aircraft.

The ENPU may thus receive an AC input voltage 201 typically of 115 volts from the network and a low DC voltage 202 of 28 volts.

It may also receive a DC voltage 203 directly from the cockpit, typically 350 volts.

In the case when the electrical network of the aircraft is an AC network, the ENPU 200 ensures rectification 210 and filtering of this current in order to deliver an electric DC voltage to the FADEC 100, via the voltage distribution bus 20.

The ENPU 200 transforms and thereby adapts the electric signal from the airplane network so as to provide a regulated DC voltage (passing from 115 volts to about a DC voltage of 270 volts), in order to power the electric motors of the members for maneuvering the electrical devices of the nacelle.

Moreover, the ENPU 200 comprises an inhibition switch 220 intended for cutting the electric power supply of the unit in the case of maintenance of the EEC 110 of the FADEC 100.

Moreover, the ENPU 200 ensures the respective control 230, 240 of the primary locks and/or of the brake for the displaceable elements of the thrust inverter of a nacelle, this in order to ensure segregation of the defence lines.

As the locks and brake are electrically controlled, they are powered via the ENPU 200 with a rectified and filtered AC voltage or a DC voltage via the respective power supply lines 231, 241, and 232, 242 as described earlier. Moreover, the ENPU 200 also ensures the control of a discharge resistance or PLR of the engines of the nacelle, required when the latter are in a generating phase.

Of course, the invention is not limited to these sole embodiments of the thrust reversal described above as examples, but it encompasses on the contrary all the possible alternatives.

The invention claimed is:

1. A control system of an aircraft propelled by at least one jet engine housed in a nacelle, the control system comprising:
    a full authority digital engine control unit of the at least one jet engine, the full authority digital engine control unit monitoring the at least one jet engine, and directly monitoring and controlling at least one electrical device of the nacelle; and
    an electric power unit of the nacelle external to the full authority digital engine control unit, said electric power unit managing electric powering of said electrical device of the nacelle.

2. The control system according to claim 1, wherein the at least one electric device of the nacelle is a thrust reversal device, a defrosting device or a variable nozzle device.

3. The control system according to claim 2, wherein the full authority digital engine control unit of the at least one jet engine is capable of ensuring the driving of displaceable elements of the thrust reversal device and electromechanical maneuvering members intended for maneuvering said displaceable elements.

4. The control system according to claim 3, wherein the full authority digital engine control unit of the at least one jet engine is capable of ensuring the driving of sequences for controlling actuators for the displaceable elements of the thrust reversal device.

5. The control system according to claim 3, wherein the full authority digital engine control unit of the at least one jet engine is capable of ensuring the driving of position sensors, proximity sensors and/or state detectors of the displaceable elements and/or electromechanical maneuvering members.

6. The control system according to claim 3, wherein the full authority digital engine control unit of the at least one jet engine is capable of ensuring the driving of a secondary lock of a displaceable element of the thrust reversal device.

7. The control system according to claim 2, wherein the electric power unit of the nacelle is capable of driving sequences for controlling a primary lock and/or a brake of the thrust reversal device.

8. The control system according to claim 1, wherein the full authority digital engine control unit of the at least one jet engine and the electric power unit of the nacelle are connected through an electric power supply bus.

9. The control system according to claim 1, wherein the electric power unit of the nacelle comprises means for rectifying and filtering electric current from an electric network.

10. An aircraft propelled by at least one jet engine housed in a nacelle, comprising a control system according to claim 1.

* * * * *